(12) United States Patent
Zeng et al.

(10) Patent No.: US 10,032,553 B2
(45) Date of Patent: Jul. 24, 2018

(54) TRANSFORMER UNIT AND POWER CONVERTER CIRCUIT

(71) Applicant: Delta Electronics (Shanghai) CO., LTD, Shanghai (CN)

(72) Inventors: Jianhong Zeng, Shanghai (CN); Xiaoni Xin, Shanghai (CN)

(73) Assignee: Delta Electronics (Shanghai) CO., LTD, Shanghai (CN)

( * ) Notice: Subject to any disclaimer, the term of this patent is extended or adjusted under 35 U.S.C. 154(b) by 1 day.

(21) Appl. No.: 15/379,727

(22) Filed: Dec. 15, 2016

(65) Prior Publication Data

US 2017/0271073 A1    Sep. 21, 2017

(30) Foreign Application Priority Data

Mar. 17, 2016    (CN) .......................... 2016 1 0152983

(51) Int. Cl.
*H01F 27/28*    (2006.01)
*H02M 5/12*    (2006.01)
*H01F 27/34*    (2006.01)

(52) U.S. Cl.
CPC ....... *H01F 27/2804* (2013.01); *H01F 27/346* (2013.01); *H02M 5/12* (2013.01); *H01F 2027/2809* (2013.01)

(58) Field of Classification Search
CPC ........ H01F 30/06; H01F 27/06; H02M 3/335; H02M 77/003
USPC ...... 363/16, 17, 97, 98, 21.08, 21.12, 21.16, 363/74; 336/61, 92, 170, 171, 180, 192, 336/200, 223
See application file for complete search history.

(56) References Cited

U.S. PATENT DOCUMENTS

| | | | | |
|---|---|---|---|---|
| 6,757,174 B2 * | 6/2004 | Nagai | ................. | H01F 27/2804 336/200 |
| 6,831,544 B2 * | 12/2004 | Patel | ................... | H01F 27/2804 336/200 |
| 6,844,804 B2 * | 1/2005 | Gijs | .................... | H01F 17/0006 336/200 |
| 6,972,656 B2 * | 12/2005 | Takeshima | .......... | H02M 3/3376 336/180 |
| 7,167,074 B2 * | 1/2007 | Fenner | ................ | H01F 27/2804 336/200 |
| 7,602,154 B2 * | 10/2009 | Fu | .......................... | H02M 1/08 363/21.06 |
| 9,431,164 B2 * | 8/2016 | Barry | ................. | H01F 27/2804 |

* cited by examiner

*Primary Examiner* — Rajnikant Patel
(74) *Attorney, Agent, or Firm* — Yunling Ren

(57) ABSTRACT

A transformer unit and a power converter circuit are provided. The transformer unit includes: a first secondary wiring layer including a first secondary winding; a second secondary wiring layer adjacent to the first secondary wiring layer and including a second secondary winding, a first end of the second secondary winding being connected to a first end of the first secondary winding via at least one first via hole; and a plurality of primary wiring layers including a primary winding, the first secondary wiring layer and the second secondary wiring layer being disposed between the plurality of primary wiring layers, wherein at least one of the first via hole is disposed within a projection of the primary winding in the plurality of primary wiring layers.

16 Claims, 19 Drawing Sheets

TRANSFORMER UNIT AND POWER CONVERTER CIRCUIT

CROSS REFERENCE

This application is based upon and claims priority to Chinese Patent Application No. 201610152983.X, filed on Mar. 17, 2016, the entire contents thereof are incorporated herein by reference.

TECHNICAL FIELD

The present disclosure relates to the field of power supply technology, and more particularly, to a transformer unit and a power converter circuit using the transformer unit.

BACKGROUND

With the development of data centers, an input of the point-of-load (POL) may be converted from 12V to 48V, or even up to 400V, while generally an output voltage of the POL is relatively lower. Accordingly, a high-frequency converter circuit having a high input/output voltage ratio is required, and a transformer is generally included in such a circuit. However, it is also difficult to realize high efficiency under a high-frequency high current at the output side. In the related art, for example, an LLC (resonant converter) topology is widely used due to its low switching loss, high efficiency, and easily extensible output power. In an application with a low-voltage-high-current output, as illustrated in FIG. 1, generally a plurality of transformers are connected in series at the high voltage side and in parallel at the low voltage side. The circuit illustrated in the dashed block shown in FIG. 1 may be defined as a transformer unit. As illustrated in FIG. 2, the transformer unit may include a primary winding at the high voltage side and a secondary winding at the low voltage side. As illustrated in FIG. 2, the low voltage side further includes two switching devices. A transformer is an essential electromagnetic element in a 48V/400V level application of the board level of the data center, and optimizing the transformer is a key factor for improving efficiency.

The transformer unit illustrated in FIG. 2 is a transformer winding structure with taps, which includes a primary winding W3, secondary windings W1 and W2 and switching devices Q1 and Q2. The secondary windings W1 and W2 are connected via at least one via hole C, and the switching devices Q1 and Q2 are connected via at least one via hole D. Alternate current (AC) flows in a loop formed by the series connected secondary windings W1 and W2 and switching devices Q1 and Q2. In a high frequency application, lowering an impedance of the AC loop at the low voltage side is a key factor for optimizing winding loss and inductance leakage of the transformer.

Currently, in a winding structure of a low-voltage-high-current transformer, most windings are arranged in an S/P/S structure or an S/P/P/S structure. With respect to the transformer unit of FIG. 2, it is implemented in a W1/W3/W2 structure, in which the secondary windings W1 and W2 are positioned in different layers of a print circuit board (PCB) and are nonadjacent, and an interlayer between the secondary windings W1 and W2 is a primary winding W3. The secondary windings W1 and W2 are connected via at least one via hole C. In order to reduce inductance leakage and winding loss of the transformer, the AC loop at the low voltage side is preferably disposed within a projection of the primary winding. As illustrated in FIG. 3, typically, switching devices Q1 and Q2 are disposed as close as possible to the projection of the primary winding W3, and the via hole C between the secondary windings W1 and W2 are disposed as close as possible to the projection of the primary winding W3. As illustrated in FIG. 4, for example, in some products, one of the via holes between the secondary windings W1 and W2 may be provided within the projection of the primary winding W3, so as to shorten the high frequency current loop and reduce the impedance of the loop, thereby reducing winding loss. It can be analyzed that in such a transformer winding structure, the winding loss may be reduced about 20% by introducing one such via hole. However, in such a transformer of the S/P/S structure, there cannot be too many such via holes since via holes between the secondary windings W1 and W2 will pass through the primary winding. Otherwise, the primary winding may be cut off, such that primary winding loss may be increased. Accordingly, as the number of via holes is limited, further optimization of the winding loss is also limited.

It should be noted that, information disclosed in the above background portion is provided only for better understanding of the background of the present disclosure, and thus it may contain information that does not form the prior art known by those ordinary skilled in the art.

SUMMARY

Other features and advantages of the present disclosure will become apparent from the following description, or in part, may be learned by the practice of the present disclosure.

According to a first aspect of the present disclosure, there is provided a transformer unit including:

a first secondary wiring layer including a first secondary winding;

a second secondary wiring layer adjacent to the first secondary wiring layer and including a second secondary winding, a first end of the second secondary winding being connected to a first end of the first secondary winding via at least one first via hole; and a plurality of primary wiring layers including at least one primary winding, the first secondary wiring layer and the second secondary wiring layer being disposed between the plurality of primary wiring layers, wherein at least one of the first via hole is disposed within a projection of the primary winding in the plurality of primary wiring layers.

According to a second aspect of the present disclosure, there is provided a power converter circuit including:

a primary switching unit configured to receive an input voltage and output a first output voltage;

at least one transformer unit according to anyone of the above embodiments having an input end and an output end, the input end being configured to receive the first output voltage, and the output end being configured to output a second output voltage; and a load configured to receive the second output voltage.

According to the transformer unit provided in the exemplary embodiments of the present disclosure, the first secondary winding and the second secondary winding are disposed respectively on two adjacent wiring layers, and the primary winding is disposed at both the upper and lower sides of the first and second secondary windings to form a P/S/S/P structure. Accordingly, the via holes connecting the first and second secondary windings will not penetrate the primary winding. Compared to the prior art, limitations on the number and size of the via holes are reduced greatly, and thus all or a part of the via holes may be disposed within the projection of the primary winding in the primary wiring layer. As a plurality of via holes may be disposed within the projection of the primary winding, impedance of the AC loop may be reduced greatly without affecting the primary winding of the transformer unit, thereby further reducing winding loss.

This section provides a summary of various implementations or examples of the technology described in the disclosure, and is not a comprehensive disclosure of the full scope or all features of the disclosed technology.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure. It should be appreciated that the drawings in the following description are some embodiments of the present disclosure only, and those ordinary skilled in the art may obtain other drawings form these drawings without creative labors.

DETAILED DESCRIPTION

Figure 1:
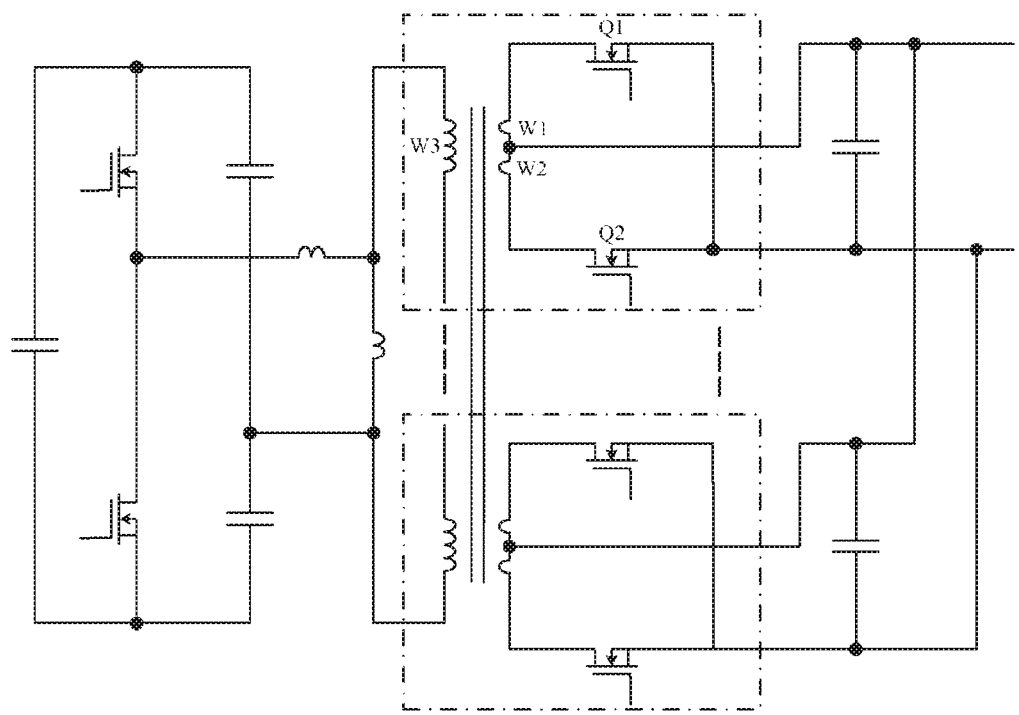
FIG. 1 is a schematic structural diagram of a resonant converter circuit according to the prior art.
Figure 2:
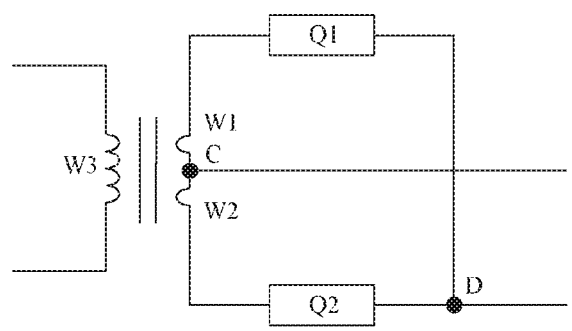
FIG. 2 is a schematic structural diagram of a transformer unit circuit according to the prior art.
Figure 3:
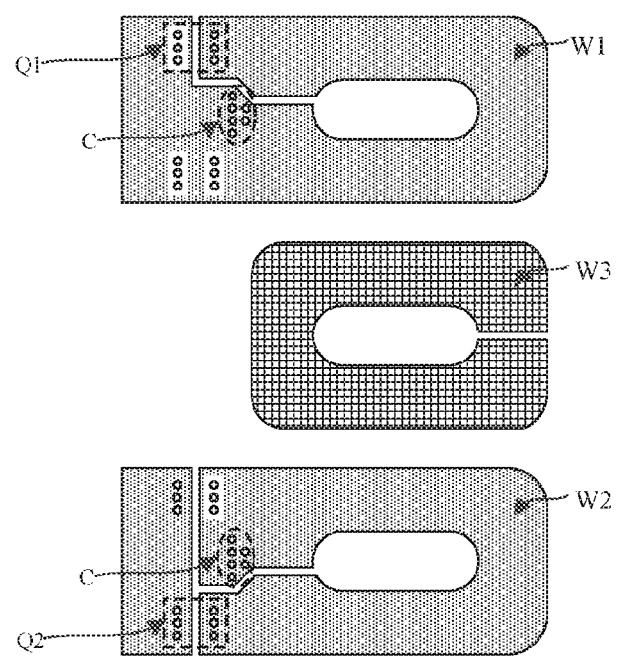
FIG. 3 is schematic wiring diagram of a transformer unit according to the prior art.
Figure 4:
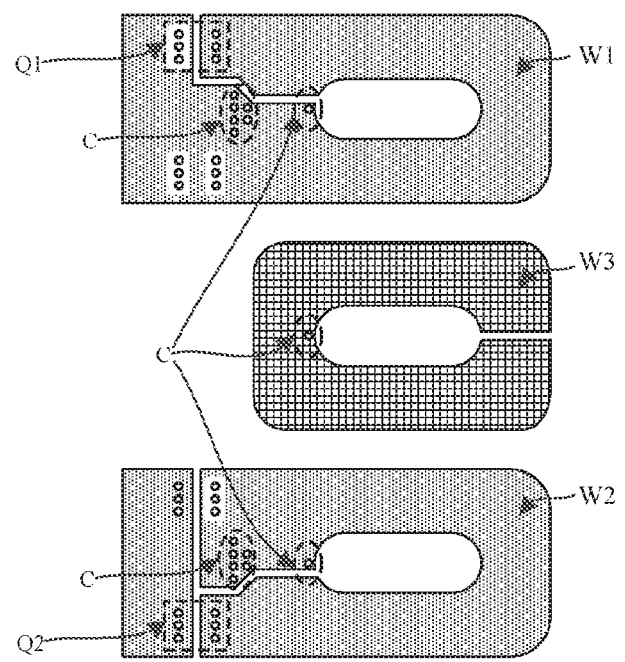
FIG. 4 is a schematic wiring diagram of a transformer unit according to the prior art.

Example implementations will now be described in further detail with reference to the accompanying drawings. The example implementation, however, may be embodied in various forms, and should not be construed as being limited to the implementations set forth herein. Rather, these implementations are provided so that the present invention will become thorough and complete, and will fully convey the concept of the inventive concept to those skilled in the art. In the drawings, thickness of areas and layers are exaggerated for clarity. Similar reference numerals denote the same or like structures throughout the accompanying drawings, and thus repeat description thereof will be omitted.

In addition, the described features, structures or characters may be combined in one or more embodiments in any suitable manner. In the following description, numerous specific details are provided so as to allow a full understanding of the embodiments of the present disclosure. However, those skilled in the art will recognize that the technical solutions of the present disclosure may be implemented without one or more of the specific details, or other methods, components, materials and so on may be used. In other cases, the well-known structures, materials or operations are not shown or described in detail to avoid obscuring various aspects of the present disclosure.

In the embodiments of the present disclosure, firstly, a transformer unit is provided. Referring to the circuit illustrated in FIG. 5, the transformer unit may include a primary winding W3, a first secondary winding W1 and a second secondary winding W2, and a first end of the first secondary winding W1 is connected to a first end of the second secondary winding W2. Referring to FIG. 6, FIG. 6 illustrates a structural implementation of the primary winding W3, the first secondary winding W1 and the second secondary winding W2 of the transformer unit circuit in FIG. 5. Referring to FIG. 6, the transformer unit may include a first secondary wiring layer A1, a second secondary wiring layer A2 and a plurality of primary wiring layers (e.g., the primary wiring layers B1 and B2 illustrated in the drawings). In one embodiment, the first secondary wiring layer A1 includes a first secondary winding W1; the second secondary wiring layer A2 is adjacent to the first secondary wiring layer A1, the second secondary wiring layer A2 includes a second winding W2, and the first end of the second secondary winding W2 is connected to the first end of the first secondary winding W1 via at least one first via hole C. According to the present implementation, for example, the plurality of primary wiring layers is illustrated to include two primary wiring layers (i.e., the primary wiring layers B1 and B2). However, those skilled in the art will appreciate that, technical solutions including more primary wiring layers also fall within the scope of the present disclosure. The two primary wiring layers include the primary winding W3, and the first secondary wiring layer A1 and the second secondary wiring A2 are disposed between the two primary wiring layers.

In one embodiment, the at least one first via hole C is disposed within a projection of the primary winding W3 in the plurality of primary wiring layers. As illustrated in FIG. 6, while designing the wiring of the transformer unit, the first secondary winding W1 and the second secondary winding W2 are disposed on two adjacent wiring layers respectively, and the primary winding W3 is disposed at both the upper and lower sides of the first secondary winding W1 and the second secondary winding W2 to form a P/S/S/P structure, accordingly, the first via hole C between the first secondary winding W1 and the second secondary winding W2 will not penetrate the primary winding W3. Accordingly, compared to the prior art, limitations on the number and size of the via holes C are reduced greatly, and thus all or a part of the via holes C (that is, at least one of the via holes C) may be disposed within the projection of the primary winding W3 in the primary wiring layer. For example, as illustrated in FIG. 6, the first via holes C indicated by the dashed lines are disposed within the projections of the primary winding W3 in the two primary wiring layers. As a plurality of via holes C may be disposed within the projection of the primary winding W3, impedance of the AC loop may be reduced without affecting the primary winding of the transformer unit, thereby further reducing winding loss.

Figure 5:
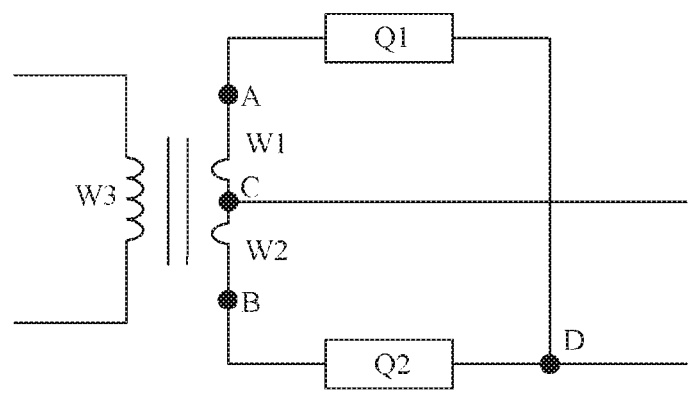
FIG. 5 is a schematic structural diagram of a transformer unit circuit according to an embodiment of the present disclosure.
Figure 6:
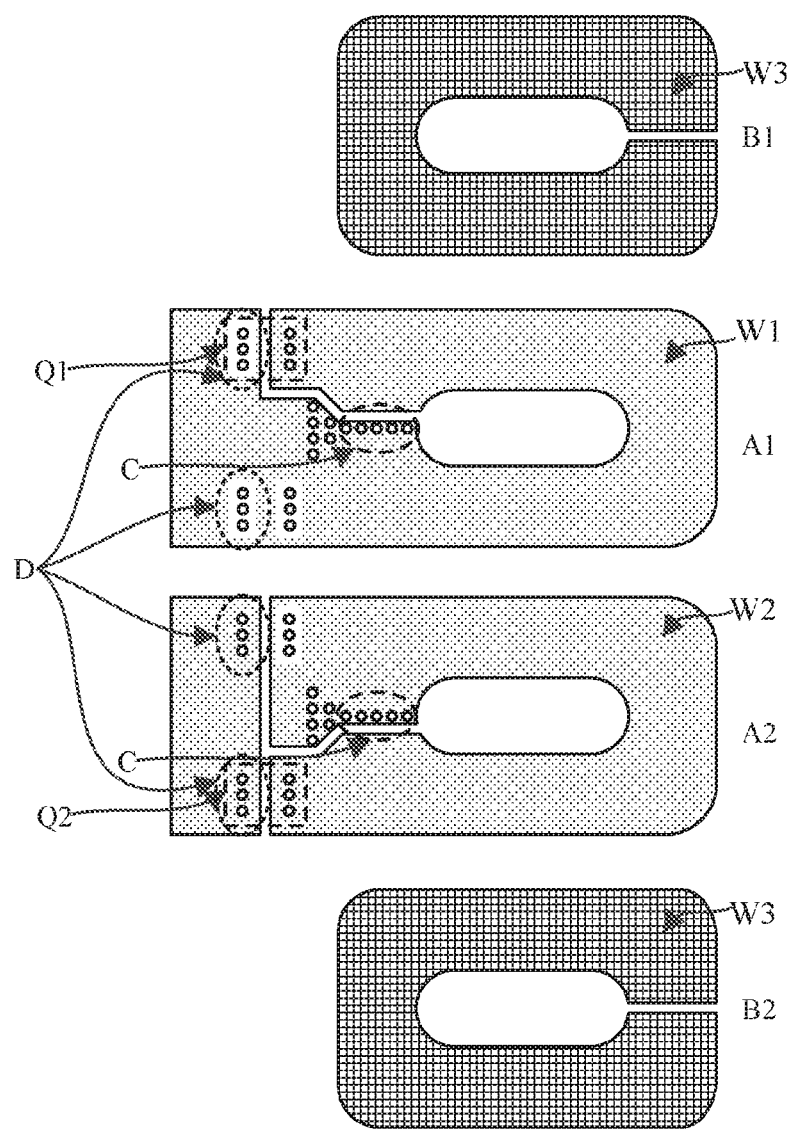
FIG. 6 is a schematic wiring diagram of a transformer unit according to an embodiment of the present disclosure.

Further referring to FIG. 5, in the present implementation, the transformer unit may further include a first switching unit Q1 and a second switching unit Q2. In one embodiment, a first power end of the first switching unit Q1 is connected to a second end of the first secondary winding W1 to form a connection point A illustrated in the drawings. A first power end of the second switching unit Q2 is connected to a second end of the second secondary winding W2 to form a connection point B illustrated in the drawings. In addition, a second power end of the second switching unit Q2 is connected to a second power end of the first switching unit Q1. In the present implementation, the second power end of the second switching unit Q2 may be connected to the second power end of the first switching unit Q1 via at least one second via hole D.

Similarly, according to FIG. 6, the transformer unit has a P/S/S/P structure, and thus the second via hole D between the first secondary winding W1 and the second secondary winding W2 will not penetrate the primary winding W3. Accordingly, compared to the prior art, limitations on the number and size of the second via holes D are reduced greatly. In an example implementation, all or a part of the second via holes D (that is, at least one of the second via holes D) may be also disposed within the projection of the primary winding W3 in the primary wiring layer, so as to reduce the impedance of the AC loop without affecting the primary winding of the transformer unit, thereby further reducing winding loss. Those skilled in the art will appreciate that, according to the present example implementation, it is possible that only all or a part of the first via hole C may be disposed within the projection of the primary winding W3 in the primary wiring layer, or only all or a part of the second via hole D may be disposed within the projection of the primary winding W3 in the primary wiring layer, or all or a part of both the first via hole C and the second via hole D may be disposed within the projection of the primary winding W3 in the primary wiring layer at the same time. Accordingly to actual requirements, the at least one first via hole C and the at least one second via hole D may be arranged differently. For example, referring to FIG. 7, the at least one first via hole C and the at least one second via hole D may be disposed alternately. Particular arrangement shapes of the alternate first and second via holes are not limited. For example, the at least one first via hole C and the at least one second via hole D may be arranged in various shapes such as a straight line, a cured line, a circular shape or a triangular shape, or may be arranged in one row or a plurality of rows. In addition, the alternate first and second via holes may be disposed such that one or more second via holes D are disposed between every two first via holes C, or two first via holes C and two second via holes D are disposed alternately, or two first via holes C and one second via hole D are disposed alternately, or one first via hole C and three second via holes D are disposed alternately, or the like. There may be various detailed forms of the alternate arrangement, which will not be enumerated herein.

Figure 7:
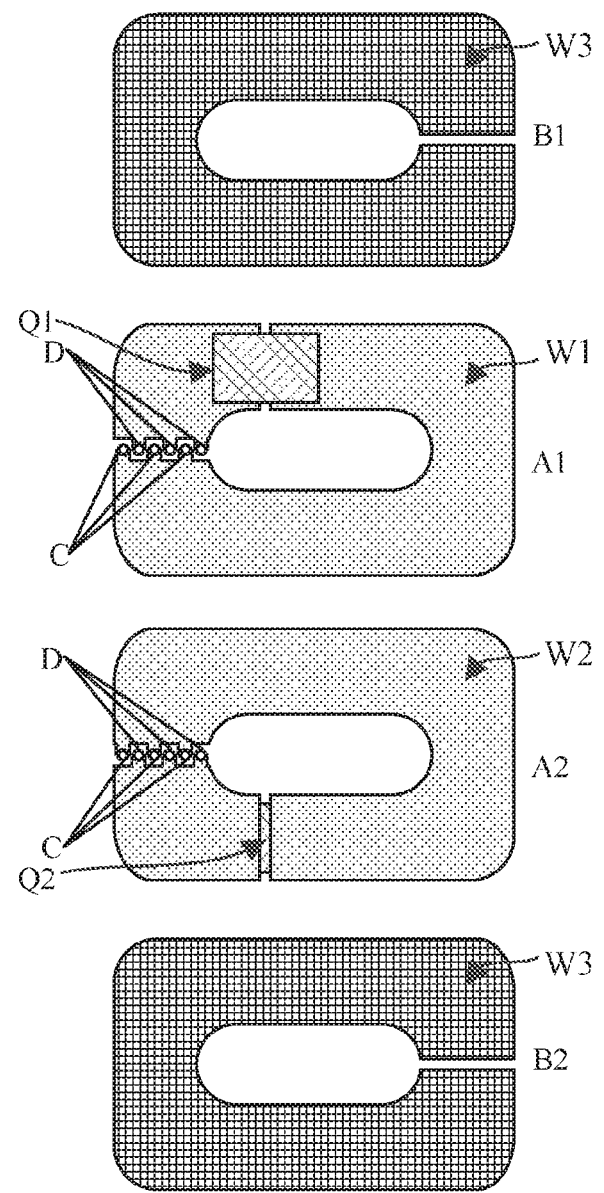
FIG. 7 is a schematic wiring diagram of another transformer unit according to an embodiment of the present disclosure.
Figure 8:
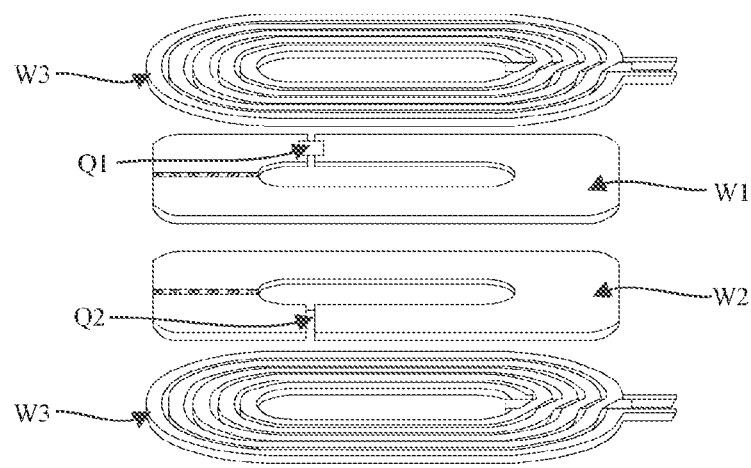
FIG. 8 is a schematic wiring diagram of still another transformer unit according to an embodiment of the present disclosure.

Further referring to FIG. 7, in the present implementation, the first switching unit Q1 and the second switching unit Q2 may be disposed at least partly within the projection of the primary winding W3 in the at least one primary wiring layer. Referring to FIG. 8, by disposing the first switching unit Q1 and the second switching unit Q2 at least partly within the projection of the primary winding W3 in the at least one primary wiring layer, and in conjunction with the above embodiments where all or a part of the first via hole C and the second via hole D are disposed within the projection of the primary winding W3, a power path formed by the first switching unit Q1 and the first secondary winding W1 and a power path formed by the second switching unit Q2 and the second secondary winding W2 are disposed at least partly within the projection of the primary winding W3 in the at least one primary wiring layer. As such, an AC loop at the secondary side may be disposed partly or entirely within the projection of the primary winding, thereby enhancing an electromagnetic coupling effect, significantly reducing inductance leakage and winding loss of the transformer, and adapting the transformer to higher frequency. In addition, in the present example implementation, the power path formed by the first switching unit Q1 and the first secondary winding W1 may at least partly overlap the power path formed by the second switching unit Q2 and the second secondary winding W2, such that the inductance leakage of the transformer unit may be further reduced. Further, as those skilled in the art will understand, a case in which at least a portion of one of the first switching unit Q1 or the second switching unit Q2 are positioned within the projection of the primary winding W3 in the at least one primary wiring layer also falls within the protection scope of the present disclosure.

Figure 9:
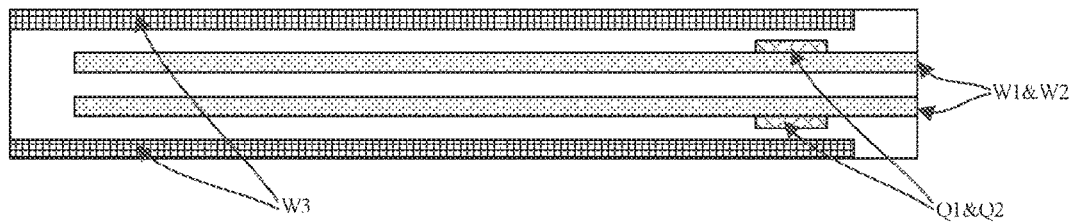
FIG. 9 is a schematic wiring diagram of still another transformer unit according to an embodiment of the present disclosure.

Referring to FIG. 9, in the present example implementation, each of the primary winding W3, the first secondary winding W1 and the second secondary winding W2 may be a PCB winding. The first switching unit Q1 may be disposed between the primary winding W3 and the first secondary winding W1. The second switching unit Q2 may be disposed between the primary winding W3 and the second secondary winding W2. In the present example implementation, the primary winding W3, the first secondary winding W1 and the second secondary winding W2 may be disposed in the same PCB.

In another implementation of the present disclosure, the primary winding W3, the first secondary winding W1 and the second secondary winding W2 may be disposed in different PCBs. The first switching unit Q1 may be disposed between the primary winding W3 and the first secondary winding W1. The second switching unit Q2 may be disposed between the primary winding W3 and the second secondary winding W2. In one embodiment, the first secondary winding W1 and the second secondary winding W2 may be disposed in the same PCB, and the primary winding W3 is disposed at both the upper and lower side of the PCB.

Figure 10:
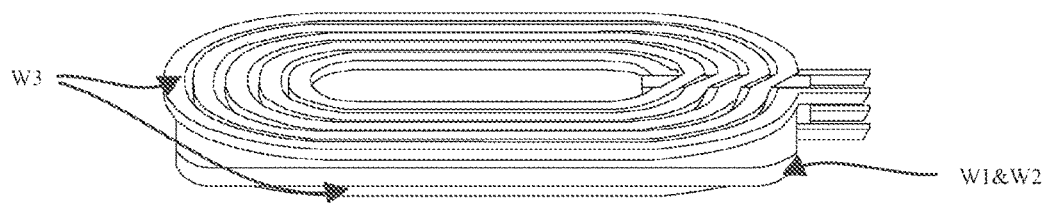
FIG. 10 is a schematic wiring diagram of yet another transformer unit according to an embodiment of the present disclosure.

Referring to FIG. 10, in other implementations of the present disclosure, the primary winding W3 may be a pie winding including at least two layers. The first secondary winding W1 and the second secondary winding W2 may be PCB windings. The first switching unit Q1 is disposed between the pie winding and the first secondary winding W1, and the second switching unit Q2 is disposed between the pie winding and the second secondary winding W2. The pie winding has advantages such as good heat dissipation, high mechanical strength and wide applicability. As can be seen from the above description, the above transformer unit is not limited to the implementation illustrated in the present implementation, rather, it may be implemented by various other available means.

Figure 11A:
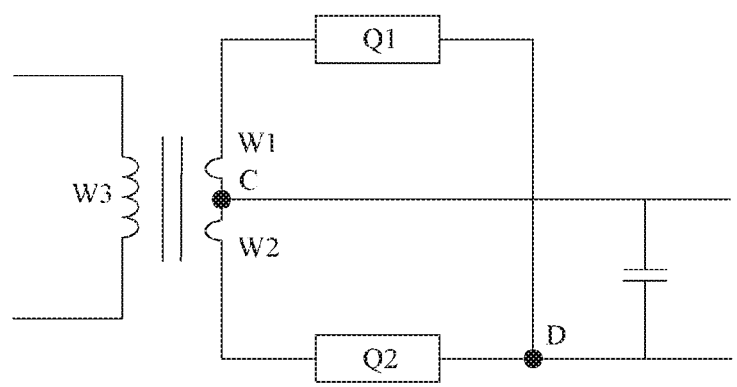
FIG. 11A is a schematic structural diagram of a transformer unit according to an embodiment of the present disclosure.
Figure 11B:
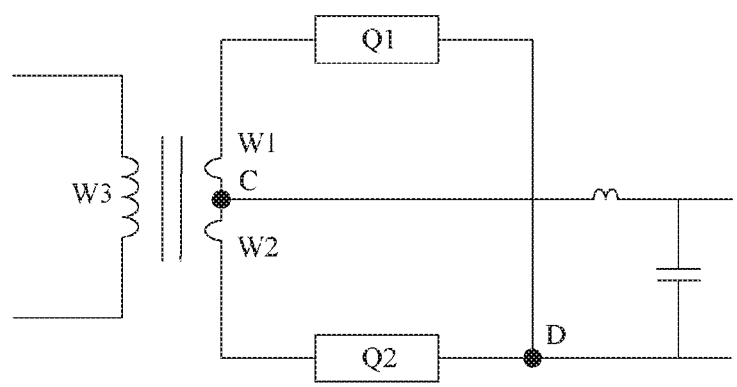
FIG. 11B is a schematic structural diagram of another transformer unit according to an embodiment of the present disclosure.

In the present example implementation, the first switching unit Q1 and the second switching unit Q2 may be metal oxide semiconductor field effect transistor (MOSFET) switches, and may also be diodes, semiconductor controlled switches (SCR), insulated gate bipolar transistor (IGBT) switches, and the like. The first via hole C and the second via hole D may be formed by general drilling and plating process of a PCB, or may be formed by laser drilling followed by a plating process. The process of laser drilling followed by plating may have a lower requirement on the diameter of the holes, and thus it is able to form more holes within a limited area. Accordingly, in a high frequency application, such a process will be more advantageous to a uniform distribution of high frequency current. Further, as illustrated in FIGS. 11A and 11B, both ends of the first via hole C and the second via hole D may be connected to capacitor units, or other elements such as a unit of inductors and capacitors in series connection, so as to provide other required functions such as filtering or voltage regulating.

Figure 12A:
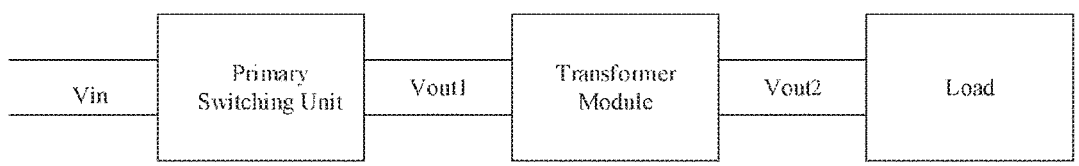
FIG. 12A is a schematic structural diagram of a power converter circuit according to an embodiment of the present disclosure.

As further illustrated in FIG. 12A, embodiments of the present disclosure further provide a power converter circuit. The power converter circuit may include a primary switching unit, at least one transformer unit according to anyone of the above embodiments and a load. In one embodiment, the primary switching unit may be configured to receive an input voltage Vin and output a first output voltage Vout1. The primary switching unit may include a MOSFET, a diode, a semiconductor controlled switch, an IGBT and the like. Each transformer unit includes an input end at the primary side and an output end at the secondary side. The input end may be configured to receive the first output voltage Vout1, and the output end may be configured to output a second output voltage Vout2. Different second output voltages Vout2 may be output by changing a turns-ratio of the primary winding and the secondary winding. The load is configured to receive the second output voltage Vout2.

Figure 12B:
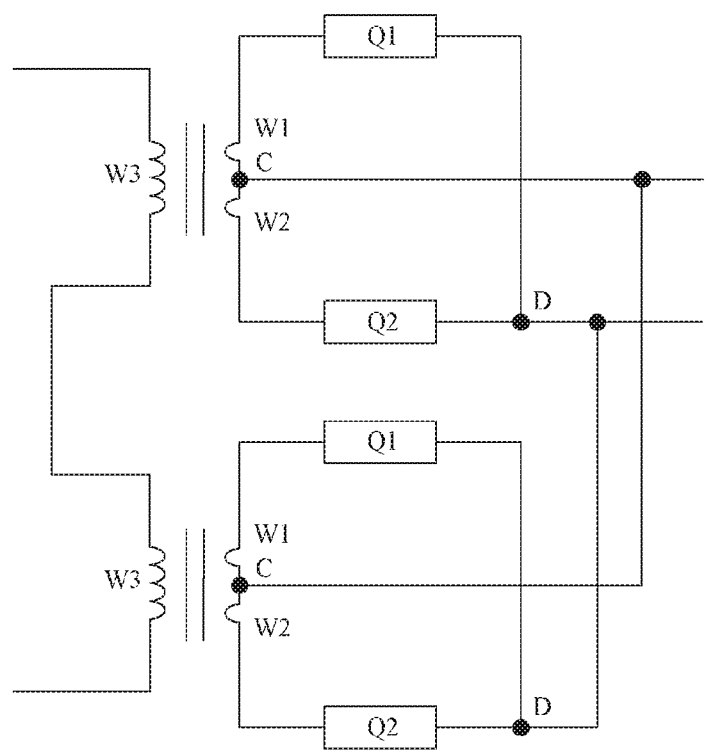
FIG. 12B is a schematic structural diagram of a transformer module according to an embodiment of the present disclosure.
Figure 12C:
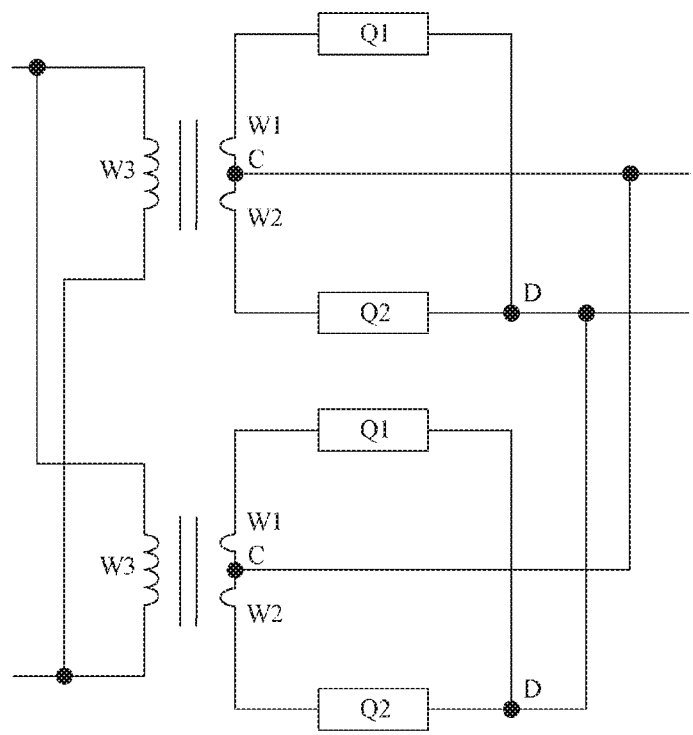
FIG. 12C is a schematic structural diagram of another transformer module according to an embodiment of the present disclosure.
Figure 12D:
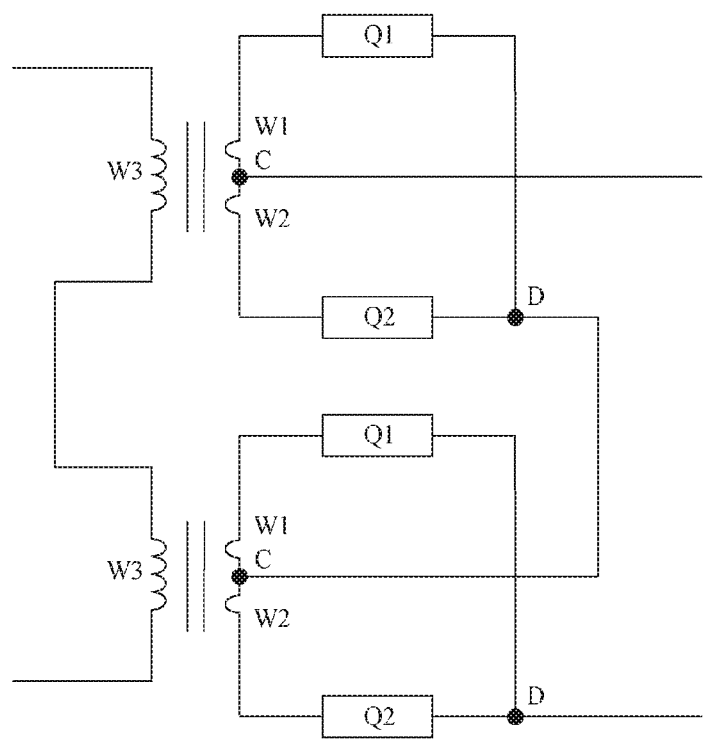
FIG. 12D is a schematic structural diagram of still another transformer module according to an embodiment of the present disclosure.
Figure 12E:
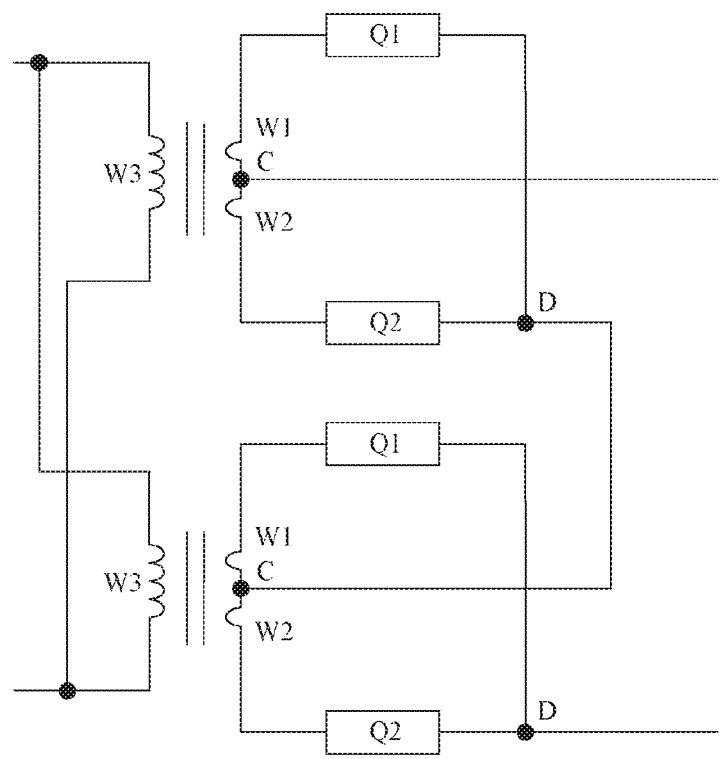
FIG. 12E is a schematic structural diagram of yet another transformer module according to an embodiment of the present disclosure.

In some application scenarios, multiple transformer units may be used in combination to meet design requirements. Input ends of the multiple transformer units may be connected in parallel or in series. Likewise, output ends of the multiple transformer units may be connected in series or in parallel. Referring to FIG. 12B or FIG. 12D, for example, a transformer module in a power converter circuit may include multiple transformer units, and input ends of the multiple transformer units may be connected in series. Alternatively, referring to FIG. 12C or FIG. 12E, the transformer module in the power converter circuit may include multiple transformer units, and input ends of the multiple transformer units may be connected in parallel. In addition, referring to FIG. 12B or FIG. 12C, the transformer module in the power converter circuit may include multiple transformer units, and output ends of the multiple transformer units may be connected in parallel. Alternatively, referring to FIG. 12D or FIG. 12E, the transformer module in the power converter circuit may include multiple transformer units, and output ends of the multiple transformer units may be connected in series. The connections between the multiple transformer units are not limited in the present example implementation.

Figure 13:
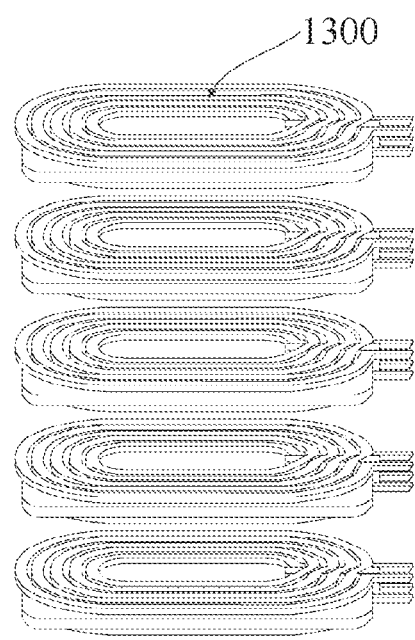
FIG. 13 is a schematic wiring diagram of a multiple transformer units according to an embodiment of the present disclosure.
Figure 14:
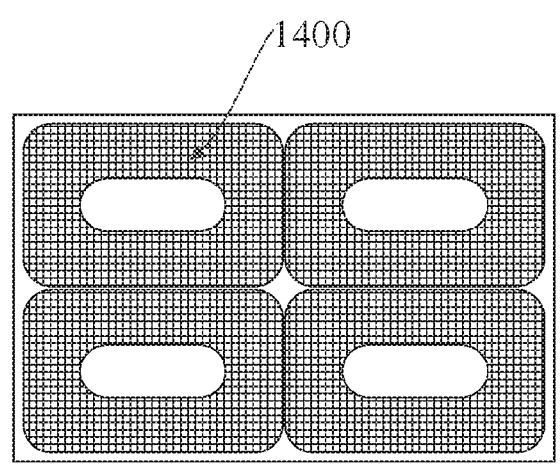
FIG. 14 is a schematic wiring diagram of another type of multiple transformer units according to an embodiment of the present disclosure.

When the multiple transformer units are used in combination, regarding the structural arrangement of the multiple transformer units, different arrangement may be used according to different application environment. For example, the multiple transformer units may be arranged in a stacked manner in a case having less height requirement. As illustrated in FIG. 13, five transformer units 1300 are stacked in a vertical direction. In other implementations of the present disclosure, the transformer units may be divided into multiple groups, at least one group includes two or more stacked transformer units. For example, the five transformer units 1300 illustrated in FIG. 13 may be divided into two groups, one of which includes three stacked transformer units 1300 and the other one includes two stacked transformer units 1300. Both of the groups may be disposed in a PCB. For example, in order to lower the total height of the transformer unit, a plurality of transformer units may be arranged in a plane, i.e., a plurality of transformer units are arranged in one planar substrate. For example, referring to FIG. 14, four transformer units 1400 are arranged in the same substrate. In addition, in other example implementations of the present disclosure, part of the transformer units may be arranged in a stacked manner, and part of the transformer units may be arranged in a plane. The detailed arrangement of the transformer units is not limited in the present example implementation.

In summary, according to the transformer unit provided by implementations of the present disclosure, two secondary windings at the secondary side are disposed on two adjacent wiring layers respectively, and all or a part of the first via holes between the two secondary windings and/or second via holes between two switching units are disposed within the projection of the primary winding. Meanwhile, the power path formed by the first secondary winding and the first switching unit and/or the power path formed by the second secondary winding and the second switching unit have their projections overlapped partly or entirely, or the paths are positioned partly or entirely within the projection region of the primary winding. As such, the first via hole and the second via hole will not penetrate the primary winding, and thus impedance of the AC loop may be reduced without affecting the loss of the primary winding. Compared to the solutions of the prior art, the winding loss may be further reduced and an optimized design scheme of high effective transformer may be provided for a high frequency converter circuit.

The present disclosure has been described by referring to the above embodiments. However, the above embodiments are examples for implementing the present disclosure only. It should be noted that, the disclosed embodiments do not limit the scope of the present disclosure. Rather, all the modification and amendments without departing from the scope and sprit of the present disclosure will fall within the patent protection scope of the present disclosure.

What is claimed is:
1. A transformer unit comprising:
a first secondary wiring layer comprising a first secondary winding;

a second secondary wiring layer adjacent to the first secondary wiring layer and comprising a second secondary winding, a first end of the second secondary winding being connected to a first end of the first secondary winding via at least one first via hole; and a plurality of primary wiring layers comprising at least one primary winding, the first secondary wiring layer and the second secondary wiring layer being disposed between the plurality of primary wiring layers, wherein at least one of the first via hole is disposed within a projection of the primary winding in the plurality of primary wiring layers.

2. The transformer unit according to claim 1, further comprising:

a first switching unit having a first power end connected to a second end of the first secondary winding; and a second switching unit having a first power end connected to a second end of the second secondary winding, and a second power end connected to a second power end of the first switching unit via at least one second via hole.

3. The transformer unit according to claim 2, further comprising:

at least one of the second via hole disposed within the projection of the primary winding of the plurality of primary wiring layers.

4. The transformer unit according to claim 2, wherein at least one of the first switching unit and the second switching unit is disposed at least partly within a projection of the primary winding in at least one of the primary wiring layers.

5. The transformer unit according to claim 2, wherein a power path formed by the first switching unit and the first secondary winding at least partly overlaps a power path formed by the second switching unit and the second secondary winding.

6. The transformer unit according to claim 2, wherein a power path formed by the first switching unit and the first secondary winding and a power path formed by the second switching unit and the second secondary winding are disposed at least partly within a projection of the primary winding in at least one of the primary wiring layers.

7. The transformer unit according to claim 2, wherein the at least one first via hole and the at least one second via hole are disposed alternately.

8. The transformer unit according to claim 7, wherein the at least one first via hole and the at least one second via hole are arranged in a straight line or a curved line.

9. The transformer unit according to claim 2, wherein the primary winding, the first secondary winding and the second secondary winding are PCB windings, the first switching unit is disposed between the primary winding and the first secondary winding, and the second switching unit is disposed between the primary winding and the second secondary winding.

10. The transformer unit according to claim 9, wherein the primary winding, the first secondary winding and the second secondary winding are disposed in one piece of PCB.

11. The transformer unit according to claim 9, wherein the first secondary winding and the second secondary winding are disposed in one piece of PCB.

12. The transformer unit according to claim 2, wherein the at least one primary winding is a pie winding and comprises at least two layers, the first secondary winding and the second secondary winding are PCB windings, the first switching unit is disposed between the pie winding and the first secondary winding, and the second switching unit is disposed between the pie winding and the second secondary winding.

13. A power converter circuit comprising:

a primary switching unit configured to receive an input voltage and output a first output voltage;

at least one transformer unit according to claim 1 comprising an input end and an output end, the input end being configured to receive the first output voltage, and the output end being configured to output a second output voltage; and a load configured to receive the second output voltage.

14. The power converter circuit according to claim 13, wherein the power converter circuit comprises a plurality of transformer units, and input ends of the plurality of transformer units are connected in parallel or in series.

15. The power converter circuit according to claim 13, wherein the power converter circuit comprises a plurality of transformer units, and output ends of the plurality of transformer units are connected in parallel or in series.

16. The power converter circuit according to claim 13, wherein the power converter circuit includes a plurality of transformer units, and the plurality of transformer units are arranged in a stacked manner or in the same plane.

* * * * *